(12) United States Patent
Cardonha et al.

(10) Patent No.: US 10,832,238 B2
(45) Date of Patent: Nov. 10, 2020

(54) TRANSACTION SYSTEM SUPPORTING UNIVERSAL TICKET SOLUTIONS FOR TRANSPORTATION

(71) Applicant: International Business Machine Corporation, Armonk, NY (US)

(72) Inventors: Carlos H. Cardonha, Sao Paulo (BR); Kiran Mantripragada, Markham (CA)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 15/450,932

(22) Filed: Mar. 6, 2017

(65) Prior Publication Data

US 2018/0253911 A1    Sep. 6, 2018

(51) Int. Cl.
 *G06Q 20/38* (2012.01)
 *G06Q 20/40* (2012.01)
 *G07B 15/02* (2011.01)

(52) U.S. Cl.
 CPC ......... *G06Q 20/381* (2013.01); *G06Q 20/405* (2013.01); *G07B 15/02* (2013.01)

(58) Field of Classification Search
 CPC .. G06Q 10/025; G06Q 50/30; G06Q 2240/10; G06Q 20/10; G06Q 20/204; G06Q 40/00; G06Q 2240/00; B60Q 3/41
 USPC .................................. 705/37, 41, 39, 14.15
 See application file for complete search history.

(56) References Cited

U.S. PATENT DOCUMENTS

| | | | |
|---|---|---|---|
| 2,595,106 A | 4/1952 | Scudder, Jr. | |
| 4,766,293 A | 10/1988 | Boston | |
| 5,352,876 A | 10/1994 | Watanabe et al. | |
| 5,852,812 A | 12/1998 | Reeder | |
| 6,609,102 B2 | 8/2003 | Kolls | |
| 6,764,001 B1 | 7/2004 | Kawai et al. | |
| 7,330,834 B1 | 2/2008 | LaPierre | |
| 7,725,387 B1 * | 5/2010 | Fitch | G06Q 40/025 705/38 |
| 8,181,867 B1 * | 5/2012 | Bierbaum | G06Q 20/322 235/375 |
| 2002/0013728 A1 | 1/2002 | Wilkman | |
| 2004/0054595 A1 | 3/2004 | Din | |

(Continued)

OTHER PUBLICATIONS

"Cash and carry: all you need to know about travel money," Ellen Creager, Detroit Free Press, Sep. 3, 2016. (Year: 2016).*

*Primary Examiner* — George Chen
*Assistant Examiner* — Brian Adams Heflin
(74) *Attorney, Agent, or Firm* — Sonny Z. Zhan (57) ABSTRACT

An embodiment of the invention provides a system and method for a transaction system supporting universal ticket solutions for transportation. A fund managing device determines whether a first fund of an account of a user has sufficient credit to satisfy a transportation fee imposed by a first city. The account of the user includes separate funds for different cities, where the funds include credit in different national currencies. An account managing device determines whether other funds of the account of the user have additional credit to satisfy the transportation fee imposed by the first city when the first fund of the account of the user does not have sufficient funds to satisfy the transportation fee imposed by the first city. A financial managing device determines costs for transferring credit to the first fund from the other funds of the account of the user.

10 Claims, 6 Drawing Sheets

(56) References Cited

U.S. PATENT DOCUMENTS

| | | | |
|---|---|---|---|
| 2009/0248574 A1* | 10/2009 | Leung | G06Q 20/10 |
| | | | 705/39 |
| 2010/0153279 A1 | 6/2010 | Zahn | |
| 2011/0251906 A1* | 10/2011 | Loevenguth | G06Q 20/10 |
| | | | 705/16 |
| 2014/0229247 A1* | 8/2014 | Seo | G06Q 20/3278 |
| | | | 705/13 |
| 2016/0063459 A1 | 3/2016 | Li et al. | |
| 2016/0104239 A1* | 4/2016 | Johnson | G06Q 40/04 |
| | | | 705/37 |
| 2016/0148192 A1* | 5/2016 | Storonsky | G06Q 20/105 |
| | | | 705/17 |
| 2018/0060843 A1* | 3/2018 | Maheshwari | G06Q 50/01 |

* cited by examiner

TRANSACTION SYSTEM SUPPORTING UNIVERSAL TICKET SOLUTIONS FOR TRANSPORTATION

FIELD OF THE INVENTION

The present invention relates to systems, methods, and computer program products for a transaction system supporting universal ticket solutions for transportation.

BACKGROUND

With the increase of traffic congestion in urban metropolises, many people choose to travel using public transportation systems, such as trains, buses and trolleys. Public transportation can often save riders time and money, while reducing the total number of automobiles on the roads, which in turn, helps other drivers save time and money, while being better for the environment. Many of these transportation systems use fare cards that are loaded with credit by the user online or at self-service kiosks.

SUMMARY OF THE INVENTION

An embodiment of the invention provides a system and method for a transaction system supporting universal ticket solutions for transportation. A fund managing device determines whether a first fund of an account of a user has sufficient credit to satisfy a transportation fee imposed by a first city. The account of the user includes separate funds for different cities, where the funds include credit in different national currencies. An account managing device determines whether other funds of the account of the user have additional credit to satisfy the transportation fee imposed by the first city when the first fund of the account of the user does not have sufficient funds to satisfy the transportation fee imposed by the first city. A financial managing device determines costs for transferring credit to the first fund from the other funds of the account of the user, where the costs include transaction fees, exchange rates, and/or taxes. The account managing device selects a fund having the lowest cost for transferring credit to the first fund.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system and method that allows for a smooth unification of billing systems associated with the use of public transportation. More specifically, passengers can employ a universal card that can be used everywhere and fees are balanced among public transportation companies (e.g., with the support of blockchain technology). Passengers can charge a universal card in different cities and countries and pay for their trips with the available credit on their universal cards independent from the place where the card was purchased. Credit transfers can be made in a way that costs for the passenger (e.g., smaller taxes, exchange rates, transaction fees) are minimized. Payments involving credit transfers can trigger blockchain transactions between public transportation companies, thus allowing for a proper distribution of money.

A universal ticket system for public transportation can be provided, in which passengers can pay for the use of the transportation system by employing (potentially dedicated) fee charger devices. This operation (or a set of operations of this nature) can be converted into a blockchain operation that can be performed among the involved public transportation companies.

Figure 1:
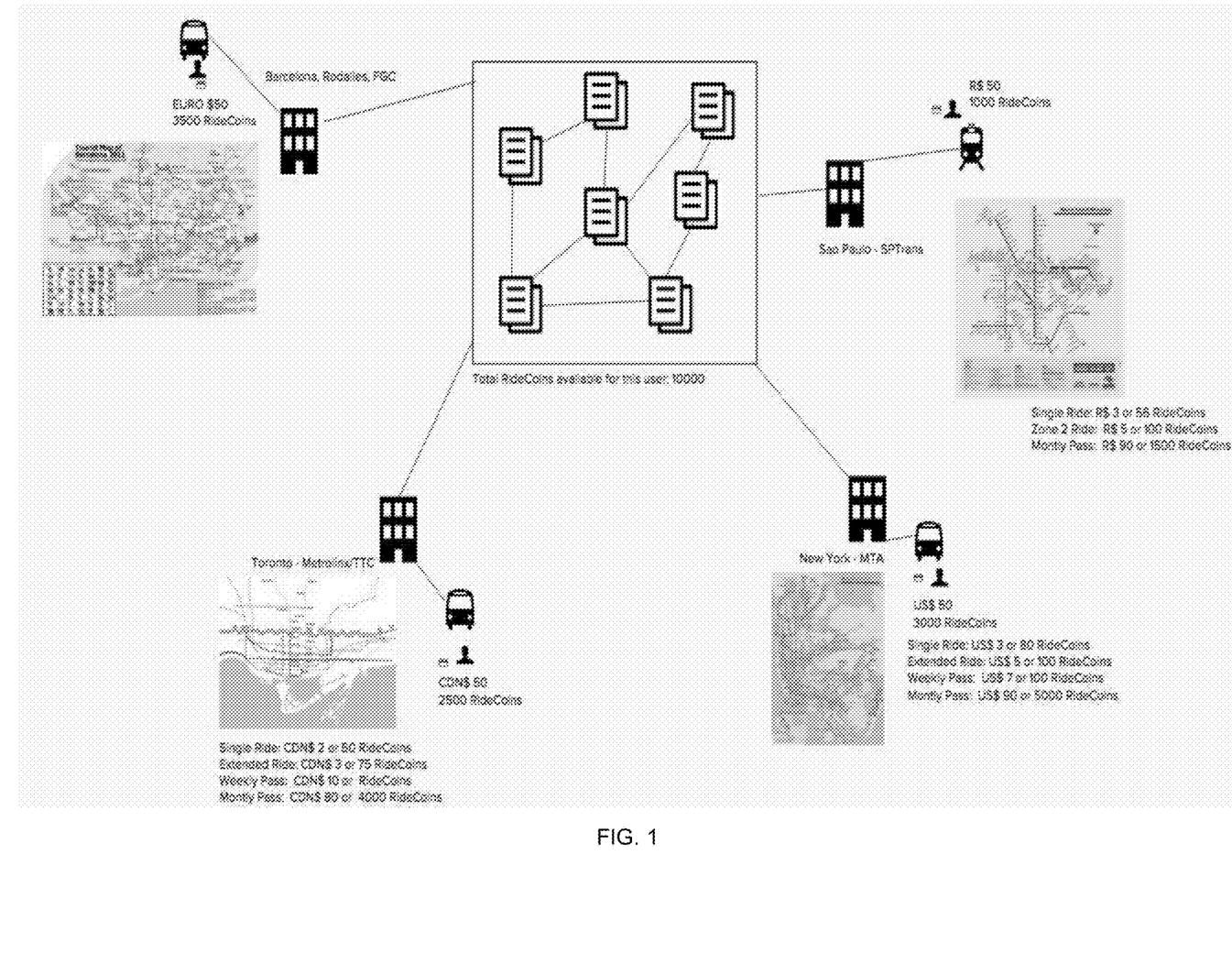
FIG. 1 illustrates a transaction system supporting universal ticket solutions for transportation according to an embodiment of the present invention.

FIG. 1 illustrates a transaction system supporting universal ticket solutions for transportation according to an embodiment of the invention. A set of participating cities/countries (or public transportation companies) can join a shared blockchain system. In the example illustrated in FIG. 1, the cities include Barcelona, Spain; Toronto, Canada; New York, United States; and Sao Paulo, Brazil.

A universal fare card can be distributed or sold to individuals in the locations where they are located. Public transportation companies can install card reading devices on stations and/or vehicles of the fleet. The card reading devices can be universal in the sense that both residents and visitors are able to employ their universal cards on the card reading devices. In another embodiment, dedicated devices are deployed for visitors.

After individuals acquire universal cards, the individuals can charge the universal cards for transportation fares. Credit on a universal card is associated with the location where the transaction was executed. For example, universal card stores information indicating that an individual charged U$50 in New York City and R$50 in Sao Paulo City. Individuals can seamlessly use the universal card on any of the local public transportation systems in the participating cities/metropolitan areas/countries.

The following description provides an example of a charging system according to at least one embodiment of the invention. X can be the fee to be paid by the passenger for her last trip in city C. The fee X can be reduced to X' with "local credit" (i.e., credit purchased in city C) available on the passenger's card. If local credit is large enough, then X'=0 and the transaction can be finished. Otherwise (i.e., local credit is not enough and, X'>0), the system can verify whether the credit purchased in other cities are sufficient to cover X'.

The system can optimize the transaction for the passenger by verifying which credit transfer would be cheaper (e.g., smaller transaction fees, better exchange rates, lower tax fees). If the credit purchased in city C' is used to cover the fee, a blockchain transaction describing the transfer of money from the public transportation company of C' to the public transportation company of C is performed. In another embodiment, the passenger is able to select foreign credit transfers that he or she wishes to execute. This operation can be either performed in real-time (i.e., at a fee charging terminal) or a priori (e.g., individual indicates preferences in a web-based system).

In at least one embodiment, the individual chooses to perform payments with currency X together with a pool of individuals. If this pool reaches a threshold, transactions involving currency X become cheaper. In certain cases, however, there might exist some risk in the pool option, such as when the threshold is not reached, some other currency Y may have been financially more beneficial.

In at least one embodiment, the system can keep track of credits in two ways: a universal monetary unit for rides/mileage and/or the current local money charged into account. For example, the passenger loads his account with: R$50 (Brazilian money, can be used all over the country of Brazil), U.S.$50 (U.S. Dollar, can be used directly all over USA); and, CDN$50 (Canadian Dollar, can be used directly all over Canada). The account can be linked to a universal transit card or multiple transit cards where each transit card can only be used in one city or country. The local currency amounts can be seamlessly converted into a universal monetary unit that can be used for transit, where the passenger can be charged based on the number of stops travelled, distance travelled, or a flat-rate charge per trip.

As an example, this global monetary unit can be named RideCoins. The sum of all local charges (e.g., R$50, U.S.$50, and CDN$50) can be converted into universal monetary units (e.g., 10,000 RideCoins), where every participating city or country can charge fares to the account. For example, a transportation authority in New York, N.Y. can charge U.S.$5.50 or 800 RideCoins to the account.

The conversion rates for fares or rides may not be standardized among all transportation providers. Transportation providers can rate the local currency, zones, and fares through different ways, including promotions and marketing to leverage the universal transportation system. For example, a local transportation provider can offer free RideCoins for new users and/or establish partnerships with other transportation providers; and, travel and tourism in a city can be leveraged through campaigns and incentives.

Figure 2:
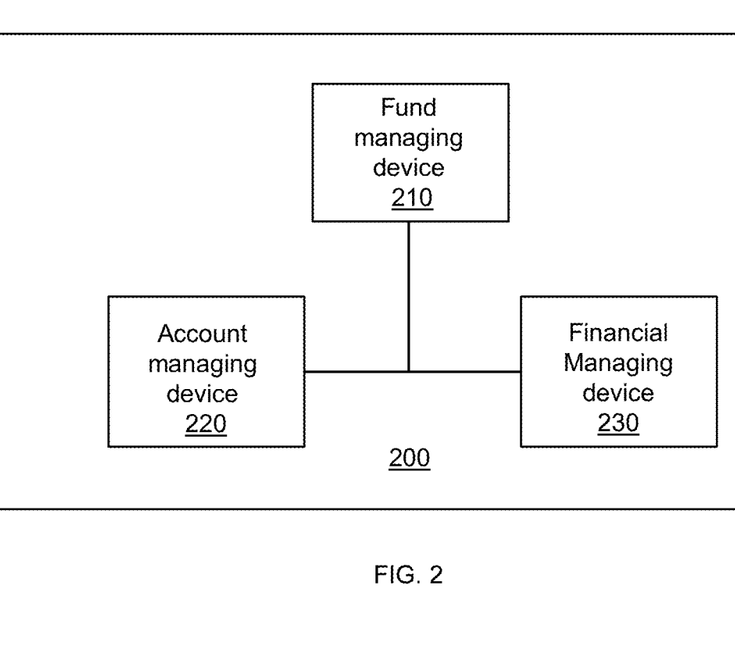
FIG. 2 is diagram illustrating a transaction system supporting universal ticket solutions for transportation according to another embodiment of the present invention.
Figure 3:
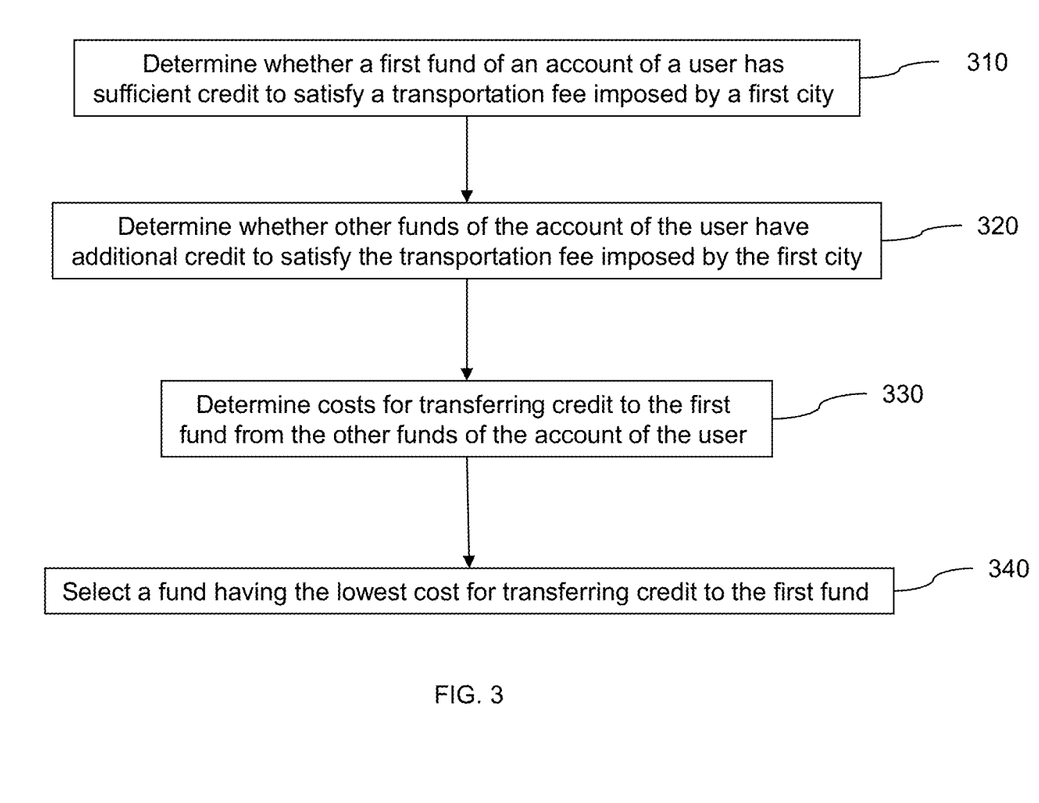
FIG. 3 is a flow diagram illustrating a method for supporting universal ticket solutions for transportation according to an embodiment of the present invention.

FIG. 2 is diagram illustrating a transaction system 200 supporting universal ticket solutions for transportation according to another embodiment of the invention. FIG. 3 is a flow diagram illustrating a method for supporting universal ticket solutions for transportation (e.g., using the system 200) according to an embodiment of the invention. A fund managing device 210 can determine whether a first fund of an account of a user has sufficient credit to satisfy a transportation fee imposed by a first city (310). In at least one embodiment, the account of the user includes separate funds for different cities, where the separate funds include credit in different national currencies. For example, the account of the user includes Euro $50, R$50 (Brazilian), U.S.$50, and CDN$50. As used herein, the term "fund managing device" includes a computer hardware device, such as, for example, a central processing unit (CPU), an integrated circuit, or a microprocessor.

When the first fund (e.g., U.S. dollars) of the account of the user does not have sufficient funds to satisfy the transportation fee imposed by the first city (e.g., Washington, D.C.), an account managing device 220 connected to the fund managing device 210 can determine whether other funds of the account of the user (e.g., euros, reals, Canadian dollars) have additional credit to satisfy the transportation fee imposed by the first city (320). As used herein, the term "account managing device" includes a computer hardware device, such as, for example, a central processing unit (CPU), an integrated circuit, or a microprocessor. As used herein, the term "connected" includes operationally connected, logically connected, in communication with, physically or wirelessly connected, engaged, coupled, contacts, linked, affixed, and attached.

In at least one embodiment, the currencies in the credit in the other funds (e.g., euros, reals, Canadian dollars) are not compatible to satisfy the transportation fee imposed by the first city (e.g., Washington, D.C.) without conversion into a national currency of the first city (e.g., U.S. dollars). A financial managing device 230 can determine costs for transferring credit to the first fund from the other funds of the account of the user (330). The costs can include transaction fees, exchange rates, and/or taxes. As used herein, the term "financial managing device" includes a computer hardware device, such as, for example, a central processing unit (CPU), an integrated circuit, or a microprocessor. The account managing device 220 can select a fund having the lowest cost for transferring credit to the first fund (340).

In at least one embodiment of the invention, the other funds of the account of the user includes a pool fund with funds from a plurality of individuals. Transaction fees using the pool fund may be lower than standard transaction fees when not using the pool fund when a threshold amount of funds in the pool fund is reached (e.g., funds from more than 20 individuals) and/or a threshold number of transactions using the pool fund is reached (e.g., 100 or more transactions using the pool fund). Credit from the pool fund can be transferred to the first fund of the account of the user when the first fund of the account of the user does not have sufficient funds to satisfy the transportation fee based on a preference set by the user.

The account managing device 220 can identify a city that the user is scheduled to visit within a predetermined time period and exclude a fund from a country of the identified city for transferring credit to the first fund. For example, if the user is planning on travelling to Spain in less than 30 days, then the account managing device 220 will exclude transfers from the euro fund to satisfy a transportation fee in the first city.

In at least one embodiment of the invention, the account managing device 220 can identify user preferences, such as a ranked list of funds in the other funds to be used when a fund in the account of the user has insufficient credit. For example, the user elects to transfer funds to a fund having insufficient credit from his or her other funds in the following order: euros, reals, Canadian dollars, and U.S. dollars. The account managing device 220 can transfer credit to the first fund from the other funds based on the ranked list of funds.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
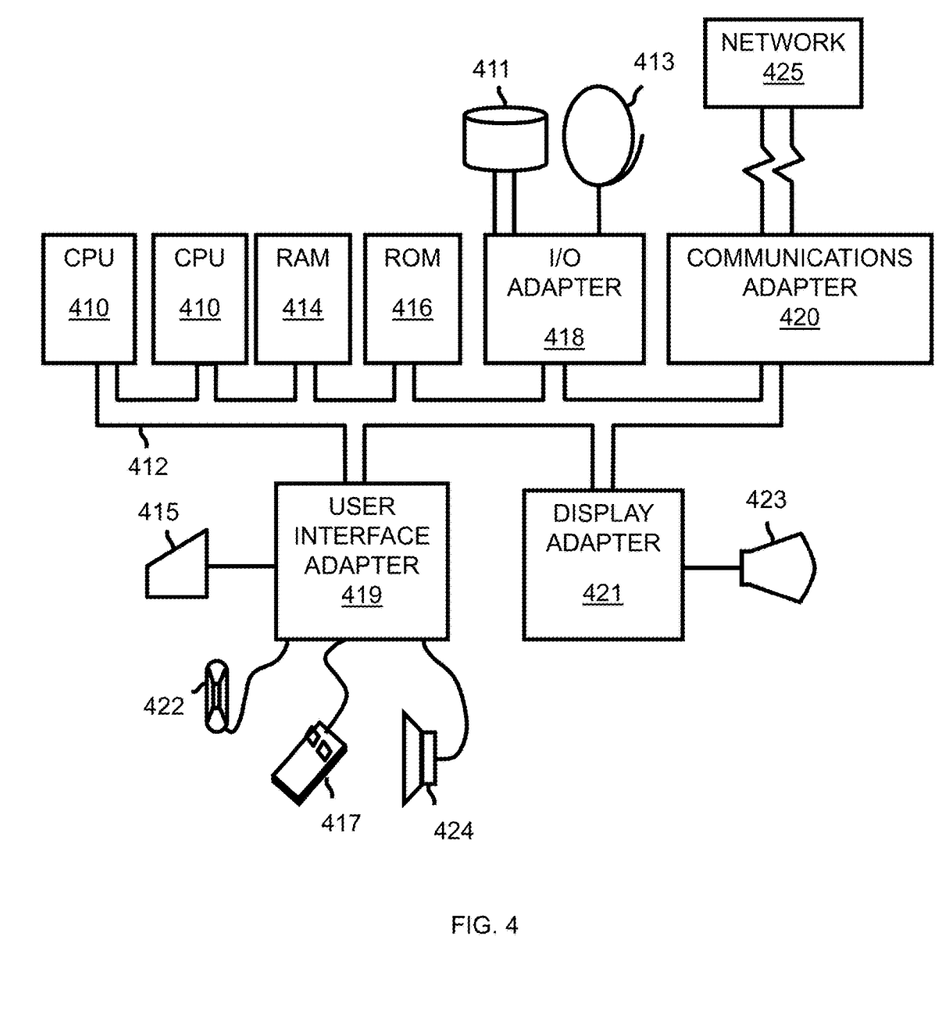
FIG. 4 is a diagram illustrating a computer program product according to an embodiment of the present invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 410. The CPUs 410 are interconnected with system bus 412 to various devices such as a random access memory (RAM) 414, read-only memory (ROM) 416, and an input/output (I/O) adapter 418. The I/O adapter 418 can connect to peripheral devices, such as disk units 411 and tape drives 414, or other program storage devices that are readable by the system. The system can read the inventive instructions on the program storage devices and follow these instructions to execute the methodology of at least one embodiment of the invention. The system further includes a user interface adapter 414 that connects a keyboard 415, mouse 417, speaker 424, microphone 422, and/or other user interface devices such as a touch screen device (not shown) to the bus 412 to gather user input. Additionally, a communication adapter 420 connects the bus 412 to a data processing network 425, and a display adapter 421 connects the bus 412 to a display device 424 which may be embodied as an output device such as a monitor, printer, or transmitter, for example.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
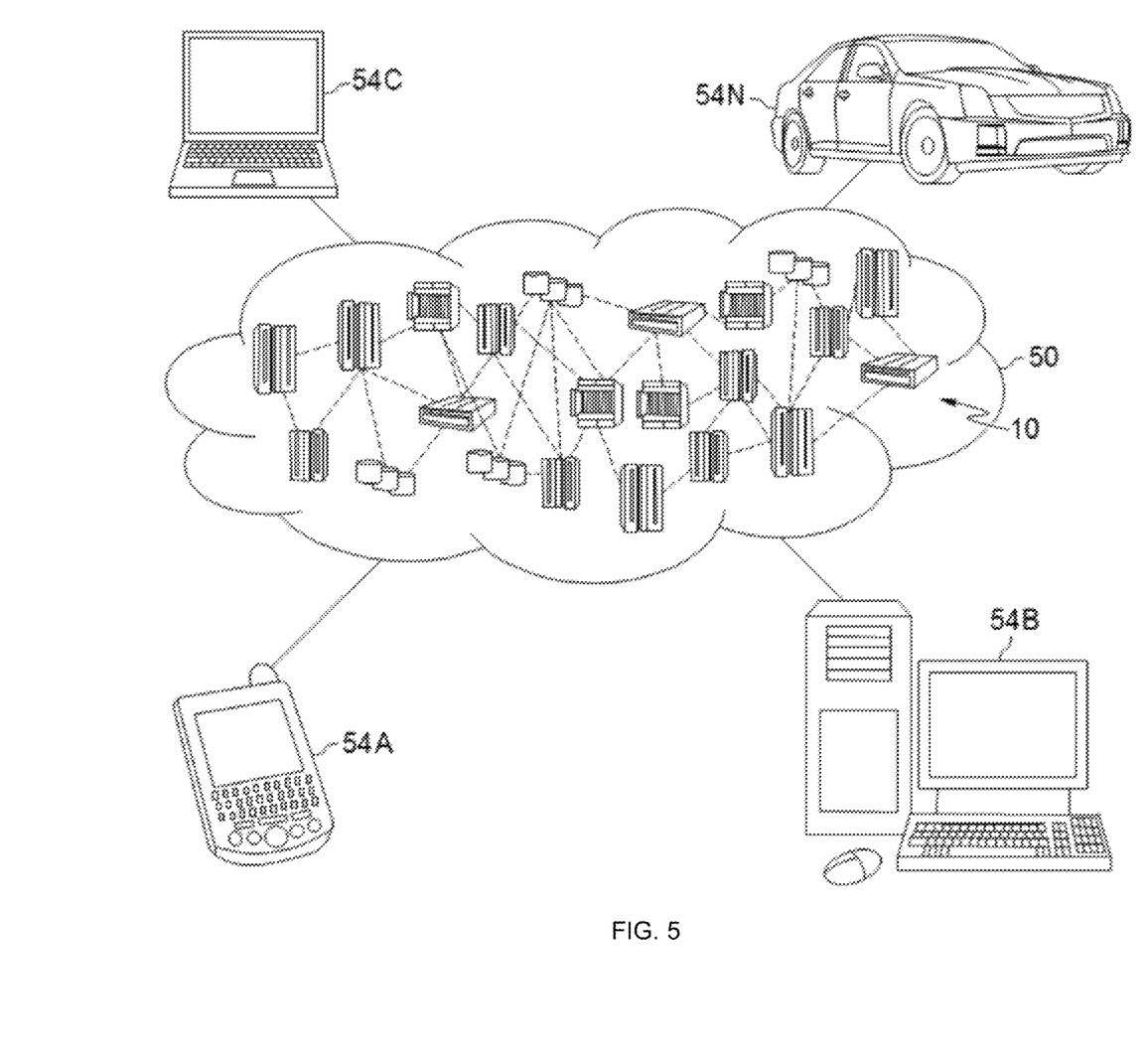
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
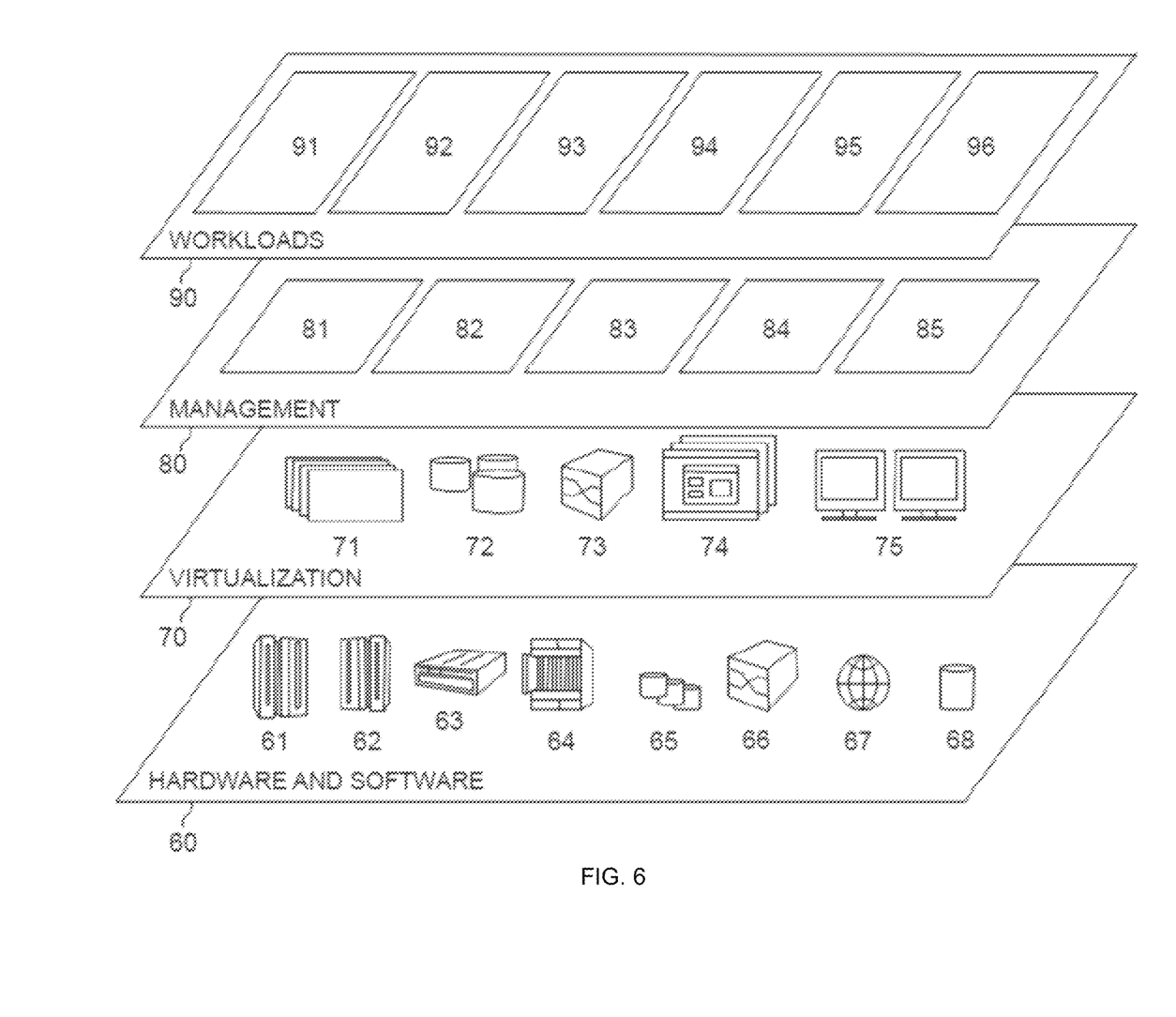
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a transaction system supporting universal ticket solutions for transportation 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    determining by a fund managing device that a first fund of an account of a user has sufficient credit to satisfy a transportation fee imposed by a first city, the account of the user including separate funds for different cities;
    determining by an account managing device that other funds of the account of the user have additional credit to satisfy the transportation fee imposed by the first city when the first fund of the account of the user does not have sufficient funds to satisfy the transportation fee imposed by the first city;
    determining by a financial managing device costs for transferring credit to the first fund from the other funds of the account of the user;
    identifying a future city that the user is scheduled to visit within a predetermined time period;
    excluding a transfer from a fund from a country of the identified city to the first fund to satisfy the transportation fee imposed by the first city;
    identifying user preferences, the user preferences including a ranked list of two or more funds in the other funds to be used when a fund in the account of the user has insufficient credit; and
    transferring credit to the first fund from the other funds based on the ranked list of funds,
    wherein the other funds of the account of the user include a pool fund with funds from a plurality of individuals,
    wherein transaction fees of the pool fund are lower than standard transaction fees when the user does not use the pool fund when at least one of a threshold amount of funds in the pool fund is reached and a threshold number of transactions using the pool fund is reached, and
    wherein credit from the pool fund is transferred to the first fund of the account of the user when the first fund of the account of the user does not have sufficient funds to satisfy a transportation fee based on a preference set by the user.

2. The method according to claim 1, further comprising selecting by the account managing device a fund of the other funds having a lowest cost for transferring credit to the first fund.

3. The method according to claim 1, wherein the separate funds include credit in different national currencies.

4. The method according to claim 1, wherein the currencies in the credit in the other funds are not compatible to satisfy the transportation fee imposed by the first city without conversion into a national currency of the first city.

5. A method of managing a transportation fee account of a user, said method comprising:
    determining by a fund managing device that a first fund of an account of a user has sufficient credit to satisfy a transportation fee imposed by a first city, the account of the user including separate funds for different cities, wherein the separate funds include credit in different national currencies;
    determining by an account managing device that other funds of the account of the user have additional credit to satisfy the transportation fee imposed by the first city when the first fund of the account of the user does not have sufficient funds to satisfy the transportation fee imposed by the first city;

determining by a financial managing device costs for transferring credit to the first fund from the other funds of the account of the user, the costs including at least one of transaction fees, exchange rates, and taxes;

selecting by the account managing device a fund of the other funds having a lowest cost for transferring credit to the first fund;

identifying a future city that the user is scheduled to visit within a predetermined time period;

excluding a transfer from a fund from a country of the identified city to the first fund to satisfy the transportation fee imposed by the first city;

identifying user preferences, the user preferences including a ranked list of two or more funds in the other funds to be used when a fund in the account of the user has insufficient credit; and transferring credit to the first fund from the other funds based on the ranked list of funds, wherein the other funds of the account of the user include a pool fund with funds from a plurality of individuals, wherein transaction fees of the pool fund are lower than standard transaction fees when the user does not use the pool fund when at least one of a threshold amount of funds in the pool fund is reached and a threshold number of transactions using the pool fund is reached, and wherein credit from the pool fund is transferred to the first fund of the account of the user when the first fund of the account of the user does not have sufficient funds to satisfy a transportation fee based on a preference set by the user.

6. The method according to claim 5, wherein the currencies in the credit in the other funds are not compatible to satisfy the transportation fee imposed by the first city without conversion into a national currency of the first city.

7. A computer program product comprising:

a computer readable storage medium having stored thereon:

first program instructions executable by a device to cause the device to determine that a first fund of an account of a user has sufficient credit to satisfy a transportation fee imposed by a first city, the account of the user including separate funds for different cities;

second program instructions executable by the device to cause the device to determine that other funds of the account of the user have additional credit to satisfy the transportation fee imposed by the first city when the first fund of the account of the user does not have sufficient funds to satisfy the transportation fee imposed by the first city;

third program instructions executable by the device to cause the device to determine costs for transferring credit to the first fund from the other funds of the account of the user, the costs including transaction fees, exchange rates, and taxes;

fifth program instructions executable by the device to cause the device to identify a future city that the user is scheduled to visit within a predetermined time period;

sixth program instructions executable by the device to cause the device to exclude a transfer from a fund from a country of the identified city to the first fund to satisfy the transportation fee imposed by the first city;

seventh program instructions executable by the device to cause the device to identify user preferences, the user preferences including a ranked list of two or more funds in the other funds to be used when a fund in the account of the user has insufficient credit; and eighth program instructions executable by the device to cause the device to transfer credit to the first fund from the other funds based on the ranked list of funds, wherein the other funds of the account of the user include a pool fund with funds from a plurality of individuals, wherein transaction fees of the pool fund are lower than standard transaction fees when the user does not use the pool fund when at least one of a threshold amount of funds in the pool fund is reached and a threshold number of transactions using the pool fund is reached, and wherein credit from the pool fund is transferred to the first fund of the account of the user when the first fund of the account of the user does not have sufficient funds to satisfy a transportation fee based on a preference set by the user.

8. The computer program product according to claim 7, further comprising fourth program instructions executable by the device to cause the device to select a fund of the other funds having a lowest cost for transferring credit to the first fund.

9. The computer program product according to claim 7, wherein the separate funds include credit in different national currencies.

10. The computer program product according to claim 7, wherein the currencies in the credit in the other funds are not compatible to satisfy the transportation fee imposed by the first city without conversion into a national currency of the first city.

* * * * *